(12) United States Patent
Bhamidipaty et al.

(10) Patent No.: US 8,352,414 B2
(45) Date of Patent: Jan. 8, 2013

(54) SYSTEM FOR DISCOVERING BUSINESS PROCESSES FROM NOISY ACTIVITIES LOGS

(75) Inventors: Anuradha Bhamidipaty, Bangalore (IN); Krishna Kummamuru, Hyderabad (IN); Shailabh Nagar, Bangalore (IN); Ramendra Sahoo, Mohegan Lake, NY (US); Virendra K. Varshneya, Aligarh (IN); Karthik Visweswariah, Banglore (IN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 12/575,294

(22) Filed: Oct. 7, 2009

(65) Prior Publication Data

US 2011/0082716 A1    Apr. 7, 2011

(51) Int. Cl.
*G06F 7/00* (2006.01)
*G06F 17/00* (2006.01)
*G06Q 10/00* (2012.01)

(52) U.S. Cl. ........................................ 707/601; 705/348
(58) Field of Classification Search .................. 707/601; 705/348
See application file for complete search history.

(56) References Cited

U.S. PATENT DOCUMENTS

| 2004/0015378 | A1 | 1/2004 | Casati et al. |
| 2006/0184410 | A1 | 8/2006 | Ramamurthy et al. |
| 2007/0083421 | A1* | 4/2007 | McNair et al. ................... 705/10 |
| 2008/0228536 | A1 | 9/2008 | Suenbuel et al. |
| 2008/0288306 | A1 | 11/2008 | MacIntyre et al. |
| 2009/0018877 | A1 | 1/2009 | Houck et al. |

* cited by examiner

*Primary Examiner* — Shew-Fen Lin
*Assistant Examiner* — Christy Lin
(74) *Attorney, Agent, or Firm* — Brevetto Law Group

(57) ABSTRACT

A system for discovering business processes from noisy activities logs from various activities performed during the execution of the process. Activities are observed from the noisy activity logs that may include text from manually entered activity logs, chat scripts, emails, voice transcripts, desktop captures, and tool logs, wherein the noisy activity logs are received from multiple person/tool actors with each of the actors performing one or more activities related to one/more business tasks. Extracting information from the noisy activity logs to capture activity based information, and then analyzing similar activities and finding possible paths in the similar activities. The results are used to build a process graph based on the similar activities and the possible paths in the similar activities.

30 Claims, 4 Drawing Sheets

SYSTEM FOR DISCOVERING BUSINESS PROCESSES FROM NOISY ACTIVITIES LOGS

BACKGROUND

1. Field of the Invention

The present invention relates to communication and computer systems used within an organization, and more specifically, to systems, methods and computer products for data mining and analysis, and process model creation using unstructured data from the organization's computer and communications systems.

2. Description of Related Art

Business processes can sometimes be gleaned by mining data from various interactions within an organization. Typically such business processes are captured from human or machine generated text. However, conventional systems require that the parameters of the process must be very well defined before a business process can be created. Conventional discovery techniques for business processes have only been successfully implemented when the logs are machine generated, task specific (mentions the task executed) and can be parsed accurately to find the structure of the process.

The present inventors realized that what is needed is a way to discover business processes from noisy, unstructured data within the company.

SUMMARY

Embodiments disclosed herein address the above stated needs by providing systems, methods and computer readable software products for data mining to create a model of an organizational process based on noisy activity logs. In various embodiments this is done by searching for an activity of the model from a corporate information repository containing said noisy activity logs. The search may be performed without human intervention. Information is extracted from the corporate information repository to capture activity based information characterizing an activity, and the activity is then incorporated into the model. In various embodiments the search for the activity compares an ontology of said activity with a plurality of ontologies contained within said corporate information repository.

BRIEF DESCRIPTION OF THE DRAWINGS

The accompanying drawings, which are incorporated in and constitute part of the specification, illustrate various embodiments of the invention. Together with the detailed description, the drawings serve to explain the principles of the invention. In the drawings.

DETAILED DESCRIPTION

Various embodiments disclosed herein are useful for mining unstructured data and communications to discover business processes or organizational processes from noisy activities logs. A business process—or more broadly, an organizational process—is a function or series of activities performed within the organization or to further the organization's agenda or purpose. The captured process models and the extracted timing information can be used for large scale process discovery and optimization. It can be offered as a service for automated process discovery since manual discovery can be very time consuming. Typical implementations of the system can be used for mining variations of a given process. Various embodiments may also be useful for process compliance monitoring.

Figure 1:
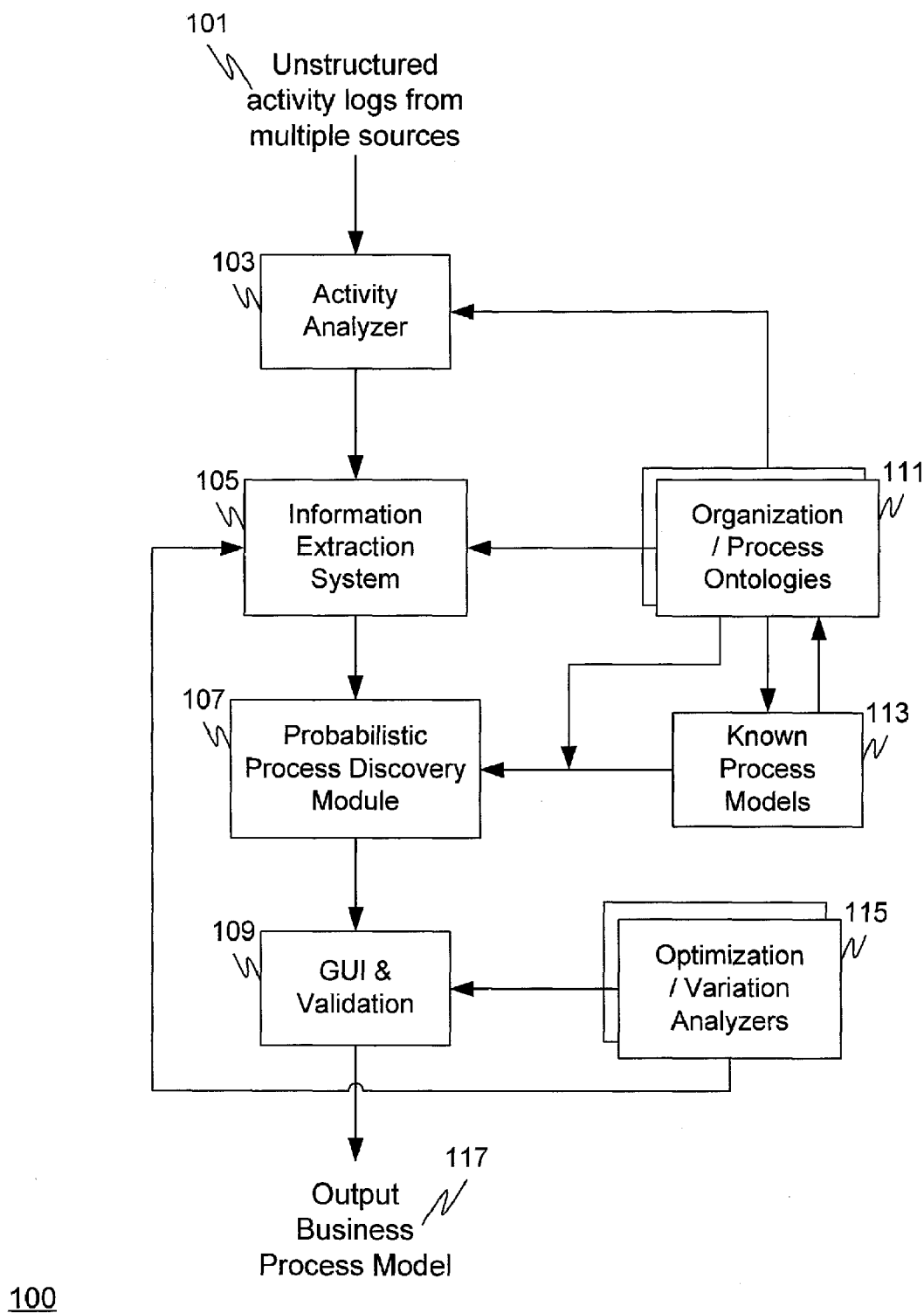
FIG. 1 depicts the flow of data as it is being processed in carrying out various embodiments disclosed herein, and the relationships between systems and activities for discovering business processes from noisy activities logs according to various embodiments disclosed herein.

FIG. 1 depicts the flow of data as it is being processed and the relationships between systems and activities for discovering business processes from noisy activities logs according to various embodiments disclosed herein. The data inputs to the system come from unstructured activity logs, that is, noisy logs. Noisy logs include activity logs entered both manually and automatically, chat scripts, emails, voice transcripts, desktop captures, tool logs, and other information sources such as organizational charts, product numbers and identifiers, shipping and order information, and the like. Further details about the sources of information in 101 is provided below in conjunction with FIG. 2.

In accordance with various embodiments an activity analyzer 103 assigns the activities in the system to the right process instances. This may be done as one of the activities during the generation a business process model, or it may be done during a general information gathering effort as part of the compiling of the corporate information repository. A process discovery module 105 generates a process model based on the information extracted from the noisy logs. The process model may either be newly created in 105, or be a previously learned process model that matches flow of information and activities detected in noisy logs. As part of the generation of the process model the information extraction system 105 analyzes and annotates activity logs based on the known organizational ontologies, process activities, or the like found in 111. Block 111 represents a previously prepared and stored corporate information repository, formatted in a manner suitable to search and match business processes and activities of the organization. Block 111 is closely related to 113, representing the stored business models that have previously been discovered or generated.

Upon completing 105 the method proceeds to block 107 to discover or identify activities to be captured in the process model. Discovering business processes from noisy activities logs often entails obtaining or creating available organizational/process ontologies suitable for data extraction. This may be done on the fly or a preliminary activity performed as part of creating the corporate information repository, as described further in conjunction with FIG. 2. Once the process/organizational ontology is available, the activities for each process instance execution data are annotated. If there are repeated activities they may be distinguish from each other using inherent time separation between them. Then a process graph is built based on the identified activities by iterating over the available instance data. The method captures the semantics of conditional execution and concurrency in the process.

A model that is overly complex may be of marginal value in analyzing and characterizing the organization's business activities. Therefore, in various embodiments a predefined cost may be used to optimize the model creation process and restrict the possible models to those that are not overly complex. Once a number of models have been successfully built and stored in 113, the system can use past results to improve future performance. Repository information of 111 and/or 113 of known activities and processes can be used to find a suitable model, or tweak the model that has been created or otherwise obtained. The system may produce several proposed models for preliminary consideration. Models that are likely to generate the observed logs can be filtered and produced for user selection. Once a model has been generated it is subjected to validation in 109. The system validates the obtained model by consulting with domain experts, and analyzes any executions that do not appear to follow the process.

Figure 2:
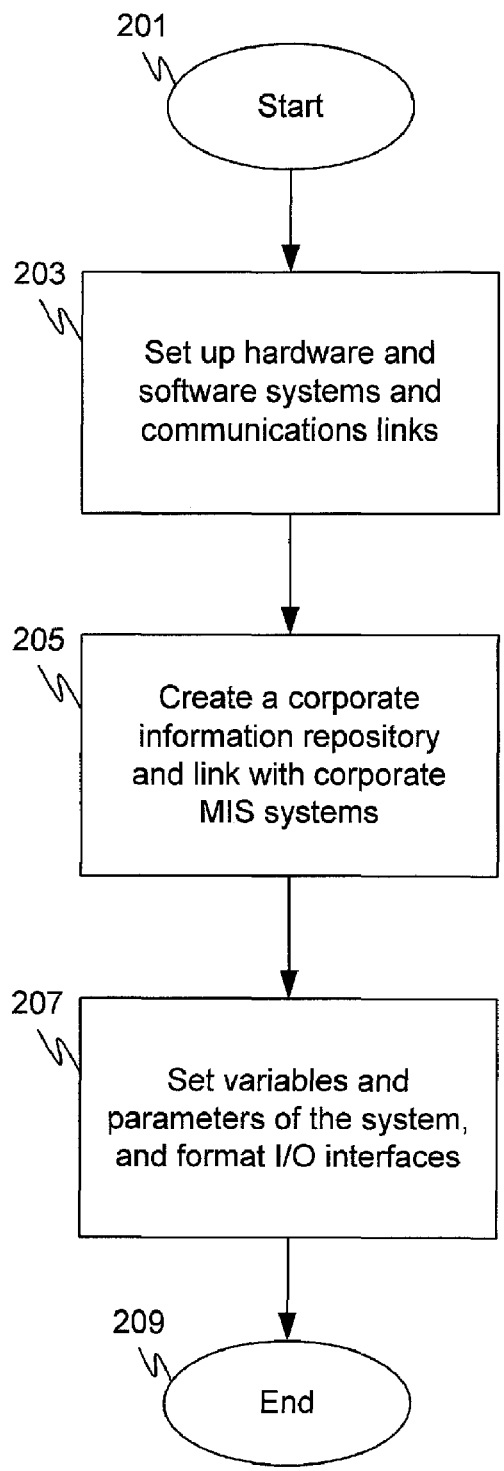
FIG. 2 depicts preliminary activities for preparing the business process mining system according to various embodiments disclosed herein.

FIG. 2 depicts preliminary activities for preparing the business process mining system according to various embodiments disclosed herein. The method begins in 201 and proceeds to 203 to configure the computers or other computational devices, and configuring them to communicate via the company's networks or other communication links. Typically, this entails loading one or more software programs onto a computer system and setting up memory storage for the data and program modules. The communication links used to gather data generally include the organization's network (if any) and primary communication system (e.g., local or wide area network (LAN or WAN), Internet portal, email or telephone order taking system, or the like). Communication links may also be established for communicating with specialized data management devices (e.g., inventory management systems, bar code readers, computer servers storing and managing the corporation's financial records, email servers, or the like). A computer system suitable for implementing the various activities disclosed herein may be any type commonly used by those of ordinary skill in the art. One such computer system for practicing the invention is discussed in further detail below in conjunction with FIG. 4.

Another system to be set up in 203 involves the techniques to be used in searching the corporate information repository. There may be many different types and formats of information stored throughout the company. To facilitate searching the disparate sources of information of various embodiments disclosed herein set up a corporate information repository, which is discussed in further detail below (in conjunction with block 205). This aids in conducting a comprehensive yet efficient search the company's various sources of information. Since the corporate information repository may contain data and information stored in many different, and possibly incompatible, formats the search strategy for using it may involve a composite strategy featuring several different types of searches. For example, the corporate information repository search may include one or more of a Google-type indexing effort, one or more database searches, stored lists of keywords, definitions and supporting documentation, automated requests for information, checking stored variables, and other such searches, requests or queries. Once the hardware systems, software systems and communication links are established in 203 the method proceeds to 205.

The corporate information repository is created in 205. The corporate information repository serves as the source of data and relationships for building process models. While the corporate information repository will include some data, it would not be practical to include copies of all the company's data. Instead the corporate information repository includes pointers to sources of the data throughout the organization (e.g., URLs, links to databases, or other such connections to sources of data). The organization's management information system (MIS) serves as one source of information for the corporate information repository. However, information may be gleaned from many different sources within the organization—some of which may be considered part of the MIS, some of which may not. For example, the company's organizational structure—the org chart—may serve as one source of information, along with the associated definitions and responsibilities for the various departments and divisions listed on the org chart. The org chart shows the interrelationship between the various departments and divisions as well as their duties and roles within the company. The information should include the reporting structure of the organization as well as any available organizational flowcharts showing responsibilities of the various departments and divisions for the goods and services produced by the company. Another aspect related to the structure of the organization is the company's overall mission, along with some explanation of how the various departments and divisions contribute to this mission.

The organization's accounting data is another source of information to be included in the corporate information repository. The accounting data should include, for example, the company's charter of accounts and definitions and data for the various general ledger accounts (GLAs). The charter of accounts links the firm's physical assets to its various billing areas. The GLAs define the various categories of assets and liabilities used in the balance sheets and income statements. Budget data should also be included for the various departments and divisions of the organization.

Another category of data to be kept in the corporate information repository is documentation of the inputs and outputs for each division and department, both in terms of goods as well as labor (services). Key definitions for the various inputs, outputs and services of the company, along with explanations of their value and use within the company, are another category of data to be accumulated within the corporate information repository. Similarly, a list of the company's suppliers and customers may be useful to have in the corporate information repository. The product numbers and identifiers and service codes for the organization's various products and services should also be maintained within the corporate information repository. Along with this, records showing the amount of products shipped and services provided should be kept, in addition to the amounts of raw material purchases and services hired by the company, and amounts of goods and raw materials being kept in inventory. This list of suppliers and customers include internal as well as external suppliers and customers. For example, an organization may employ the services of outside draftsmen in addition to using their own in-house drafting department for drawings and schematics.

One other potential source of data for the corporate information repository is the communication records for the organization. This may reveal undocumented or informal work related activities that are nonetheless important to the organization's various functions. For example, it may be the case that every time the engineering department requests draftsman time for a schematic to be drawn, the head of drafting sends out an email to the in-house draftsmen asking whether any of them have done a similar drawing or have any such unreleased drawings stored in their work related files. This informal inquiry—even though undocumented as a work process—might save considerable resources by uncovering similar efforts from the past. Such informal work related efforts may be uncovered by searching various channels of the organization's modes of communication, including for example, email, telephone records, database queries, or any other documented inquiries or communications. Upon completing the corporate information repository the method proceeds from 205 to 207.

Before beginning the process of creating business process modeling the various parameters to be used by the system should be initially set up. This is done in block 207. For example, a timeout should be specified for data queries. This avoids having the system hang up while waiting for a piece of requested information or the value of a variable to be returned. Another one of the activities of block 207 may involve a technique for providing estimates or default values for missing pieces of data. It is likely that not all of the information needed for a particular model will initially be available. Therefore, it may be more efficient to provide estimates for missing data rather than delaying completion of the model, especially if the missing data is either non-crucial to the model or lends itself to being accurately estimated. The default values and amounts to use for the estimates may be specified as part of 207. Block 207 may also entail setting up the accounts and passwords needed to access the various sources of information to be used in generating a business process model. Another activity that may be performed 207 is the creation and formatting of various input/output (I/O) interfaces used to communicate between the communication devices of the organization, as well as any graphical user interfaces (GUI) used for human interaction with the system. Once all the variables, parameters and I/Os have been set up in 207 the method proceeds to 209 and ends.

Figure 3:
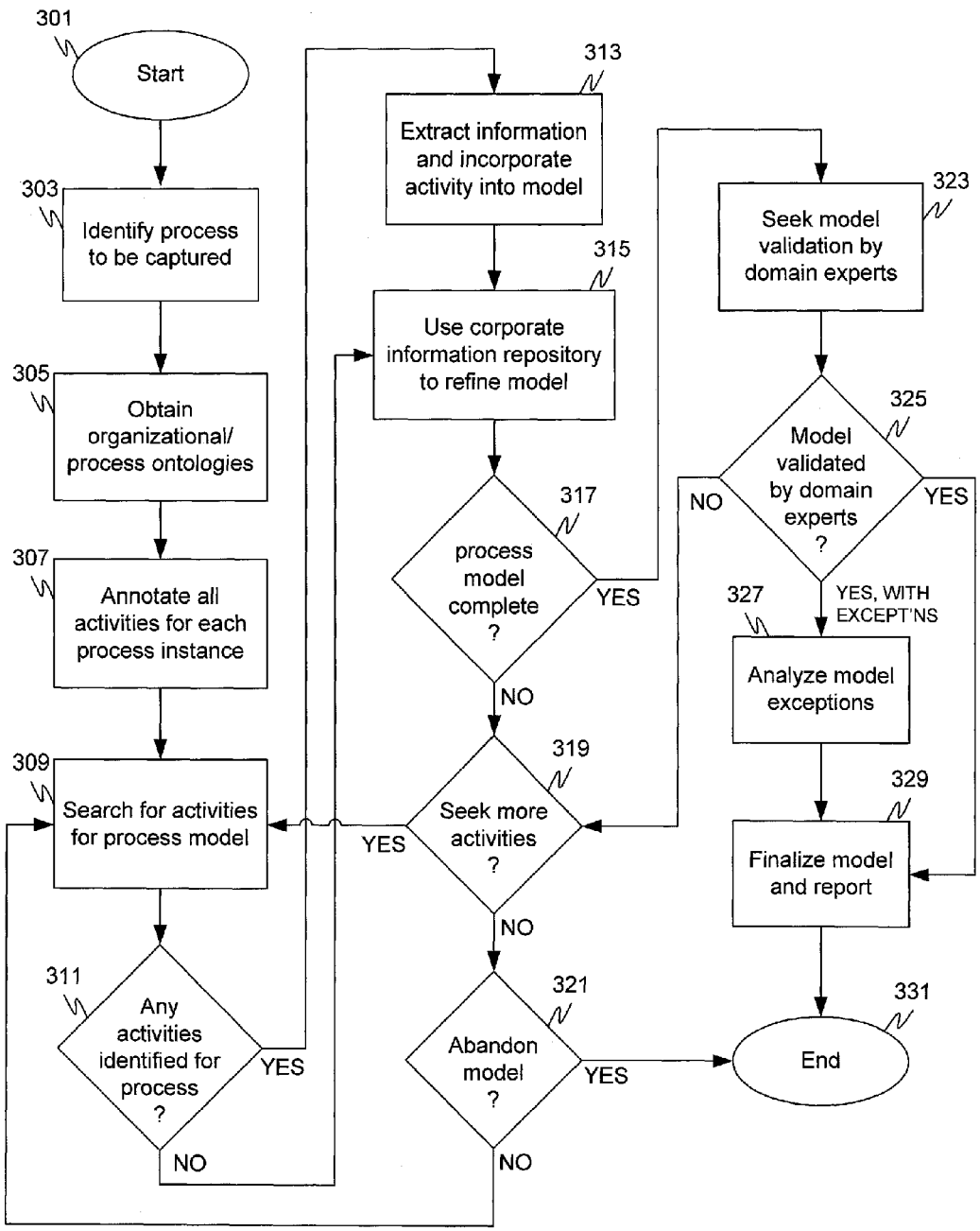
FIG. 3 is a flowchart for a method of discovering business processes from noisy activities logs according to various embodiments disclosed herein.

FIG. 3 is a flowchart for a method of discovering business processes from noisy activities logs according to various embodiments disclosed herein. The method begins at 301 and proceeds to 303 to identify the process to be captured and modeled. In some embodiments this may be done automatically—that is, without human intervention—while in other embodiments there may be a human input involved in selecting the process to be captured. A process may be automatically discovered (or selected) by the system by first identifying an output and then working backwards to determine all the inputs, communications, services and other efforts that contribute to the identified output. The output may be a product or service provided by a department or division within the company. Another way of discovering a process is to identify an input (e.g., raw materials purchases, or services provided), and then discover what the input is used for within the organization. Another way of discovering a process is to consider the sales of the organization, and then evaluate all the activities and resources that go into producing the goods or services that account for the sale.

Block 303 may accept a human input, for example, a person may select a process to be modeled from a list of potential processes. The human input may result from a prompt provided by the system (e.g., on a computer screen) providing a list of possible business processes for the user to select from in deciding what process to model. The human input may also be a hint, or suggestion, in the direction to take in selecting a model. For example, the human input may be in the form of entering a good sold, or service provided, for modeling the process of creating the good or service. The human input may also be to specify an asset or input (e.g., raw material purchase or service provided) to begin the process of modeling the uses for the input/asset. Once the process to be captured is identified in 303 the method proceeds to 305.

In 305 the system obtains organization or process ontologies. An ontology, as used herein, is a representation of a set of concepts within a domain and the relationships between those concepts. In the present context the "domain" is an organization, and the "concepts" are the goods and services used by an organization, and the data representing the goods and services—where every asset and effort of the organization can be characterized by a good or service (or combination of both). Ontologies may be used to define various aspects and characteristics of the domain (organization), and model processes that take place within the domain. For the purposes of various embodiments disclosed herein, an organization may include any type of company (including for-profit and not-for-profit), or collaborative effort intended to produce a result such as making a good or providing a service. An organization is typically a company that sells something, e.g., a good or service, for profit. The terms "organization," "company," "firm" and "corporation" are used interchangeably throughout this disclosure and do not mean to imply a particular business structure or any legal connotations in the way the entity is formed. The "corporate information repository," as this term is used herein, does not necessarily mean that the organization for which it is used is a corporation (e.g., an incorporated company), but rather, that the repository contains corporate knowledge—that is, knowledge of the organization's ontologies.

Once the various organizational and process ontologies have been gathered in 305 the method proceeds to 307 to annotate each activity. Doing this documents each activity, describing how the activity is done, what it produces, its cost, the inputs and outputs of the activity, and other relevant information germane to performing the activity. Gathering and documenting the activities—that is, blocks 305 and 307—may be done, at least in part, as one of the preliminary activities discussed in conjunction with FIG. 2. For example, the creation of the corporate information repository in 205 may include gathering and documenting various activities. In some situations, some of the activities of 305-307 may be done in anticipation of creating a particular model once the process to be captured has been identified in 303, rather than as a preliminary activity. In this way the effort expended in blocks 305-307 may be performed in a directed manner with a tangible objective in mind (e.g., a particular selected process to be captured). Upon completing 307 the method proceeds to 309.

Block 309 entails searching for activities with which to build the model. Depending upon the manner in which the process to be captured was decided upon in block 303, the search for activities may take place in any of several different manners in block 309. For example, if the process was selected based on an identified output (e.g., product or service of the organization) then the activities contributing to that output may be gleaned by working backwards to determine all the inputs, communications, services and other efforts that contribute to the identified output. On the other hand, if, in block 303, the process was selected by trying to account for an input purchased by the organization (e.g., raw materials purchases, or services provided) then discovering the activities associated with that input may entail following the input through the organization as it is used and processed to create a good or service. The search for activities may also be done in an ad hoc manner using global search techniques. For example, it may be known that the company uses custom tailored ASICs (application specific integrated circuits) as part of a given product. The search for the process of obtaining such ASICs could entail a global search on the term "ASIC" to discover the various departments within the company that may order different ASICs as well as the labs within the company (if any) with the capability to create ASIC designs. The broader global search may uncover multiple sources of ASICs—either procured or built in-house—whereas a search of only the org chart may not reveal all of these sources.

Once block 309 is completed and the corporate information repository has been searched for process activities the method proceeds to 311. In block 311 it is determined whether there were any activities identified in block 309. In some cases, no matter how comprehensive the corporate information repository is, the search for activities in 309 may not uncover any valid results. In such instances the method follows the "NO" branch from 311 to 315 to try and uncover a relevant process in another manner using the corporate information repository. In some instances a process for an activity may be uncovered in 315 by searching the corporate information repository for a similar, existing model for a related process or activity within the organization. For example, in 315 it may be determined the ontology for ASIC may contain the words "circuit fabrication." If the model calls for procurement of an ASIC but no activity can be found for procuring ASICs in step 309, then the model may be refined to search for activities related to "circuit fabrication" in 315. This related search may be performed in 315 in response to discovering the terms "circuit fabrication" in the definition of ASIC as part of the tweaking process of block 315. The method then proceeds from 315 to 317 to check the progress and accuracy of the process model being constructed.

Returning to block 311, if it is determined that one or more activities were discovered then the method proceeds from 311 along the "YES" branch to 313. Block 313 involves extracting information to capture activity based information to be used for the activity in the model. Once information characterizing the activity has been captured, the activity can be incorporated into the process model being constructed. This may entail checking the inputs and outputs of the activity to verify that the correct result is being achieved. Block 313 may also involve verifying that the department or division within the organization (if any) associated with the activity is in communication with, and has access to, the department/division at both the activity input and the activity output. For example, if the activity involves packing parts into a box, then the department that provides this service should be geographically convenient to the division where the product is produced (or shipped from). Once block 313 is completed and the identified activity is incorporated into the process model the method proceeds from 313 to 315.

In 315 the system compares the existing model being built to any similar stored models. It may be the case that the process (or activity) being worked on, or something similar, has been done in another part of the company or was previously created some time in the past. Similar processes and activities may be discovered in 315 by comparing the terms and definitions used in their ontologies. If a similar preexisting model is found it can be used to tweak the model being built, or otherwise used for comparison purposes. For example, it may be the case that the current business process under review outsources a particular activity (e.g., ASIC design, as per the example above), while in the previously constructed model the same activity was performed in-house. In such instances the current model being built can be annotated to note that, although the current model calls for outsourcing of the activity, the same activity was previously achieved in a different manner, e.g., by performing it in-house (possibly at a lab in a different division). Once the corporate information repository has been accessed in 315 to refine the current model the method proceeds to 317.

Block 317 determines whether or not the model is complete. This may be done by verifying that all aspects of the product or service being modeled are accounted for—in other words, making sure that the product/service is complete from the raw materials required to make the product all the way through the company to its sale and invoicing. If it is determined in 317 that the process model is not yet complete the method proceeds from 317 along the "NO" path to 319 to ascertain whether there are more activities that need to be modeled. If, in 319, it is determined that there are further activities needed to define some aspect of the model being constructed then the method proceeds from 319 along the "YES" path back to 309 to again search the corporate information repository for activities to complete the model. However, it may be determined in 319 that no more activities are to be sought for the model. This can occur if the method of creating the model has looped around through 319 a predetermined number of times without successfully completing the model or activity being worked on, or making acceptable progress in the model (e.g., as judged by adding new activities to the model).

The decision block 319 may have an option to avoid stalling the model building process if no suitable activity is discovered within the corporate information repository to further the construction of the model. Rather than allowing an infinite loop to continue, once the predetermined number of loops has been reached (e.g., two or more) the method may assume that no suitable activities can be found in the corporate information repository to continue making progress in constructing the model. In such cases the method may either end (in accordance with the "YES" branch of 321 described below) or the method may call for human intervention to help the model building process along (not shown). If human intervention is called for at this point a prompt will be provided to the user requesting entry of a business activity to further the model building endeavor. Upon receiving the input of an activity from the user the method would again proceed to block 309.

Returning to block 319, if it is determined in no more activities are to be sought (and the human intervention option is not implemented or not chosen) then the method proceeds from 319 along the "NO" branch to 321. Block 321 determines whether the model building effort is to continue or be abandoned. In some situations the data contained in the corporate information repository may not be sufficient to support an automatic model building effort, resulting in the current model being reaching an impasse before it is completed. In such cases the method proceeds from 321 along the "YES" path to 331 and ends. However, if it is determined in 321 to continue with the effort to build the business process model the method proceeds from 321 along the "NO" path back to 309 to again search for activities to further construction of the model.

Back in block 317, if it is determined that the process model is complete the method proceeds along the "YES" path to 323 to attempt to validate the model. This may be done by domain experts. For example, the department managers or engineers responsible for various activities can be consulted to verify their department's role is accurately portrayed in the model. The validation may be performed in any of several different manners, either with or without human intervention. For example, the method may check all inputs to the product and service, verifying that each activity's output matches up to a corresponding input of the next activity. Another check may be to account for all of the cost that goes into the good or service that the model produces. If the dollar cost does not add up then the model likely needs to be adjusted somewhere to account for the costs of goods or services used in the final product/service being created. Some companies have their employees account for time spent on various projects by keeping track of the hours each employee spends working on various GLAs (general ledger accounts). In such systems a verification effort can be performed to ensure that all the hours charged to creating a particular good or service are accounted for in the model. A similar effort can be made to make sure that all of the raw materials and subcontracted labor are accounted for in the model. The validation of 323 may involve performing one or more of these checks, or other such checks or validation techniques as are know to those of ordinary skill in the art.

Upon completing 323 the method proceeds to 325 to ascertain whether the model has been validated or otherwise approved. If the validation fails the method proceeds from 325 along the "NO" branch back to 319 to determine whether the model building effort is to be continued by seeking more activities to complete the model. However, if it is determined in 325 that the model is valid then the method proceeds from 325 along the "YES" branch to 329 to finalize the model and associated documentation. In some instances the model may be validated with exceptions. For example, the domain experts may point out that the model is valid, however there is an alternative way of performing one or more of the activities. Or it may be pointed out that, while the model is valid, the domain expert's department is in the process of revising their way of performing an activity, e.g., they are in the process or outsourcing an activity previously performed in-house. Any other such variation on one of the model activities could be listed as an "exception" within the process model. If, in block 325, the model is validated with exceptions the method proceeds from 325 to block 327. In 327 the exceptions are analyzed and documented. In some cases the model may be altered to depict an alternate way of performing an activity so as to conform to one of the exceptions brought up by a domain expert.

Once the exceptions have been analyzed and accounted for in 327 (by possibly adding an alternate path in the model for performing an activity), the method proceeds to 329. In block 329 the model is finalized by annotating the various activities to describe their functions in detail. Supporting information from the corporate information repository associated with each activity may be used for this documentation. In addition, various points of contact within the organization may be provided for key activities. The documentation may also contain cost estimates for each activity, raw material or amount of labor involved in the various activities. Finally, the report may include suggestions for improvements in the process. The suggestions may come from the domain experts in step 323, or may come by discovering an alternate, similar model in step 315. Another activity that may occur in 329 is the formatting of the model with a suitable GUI I/O to make it more user friendly. Once the process model has been finalized and documented in 329 the method proceeds to 331 and ends.

Figure 4:
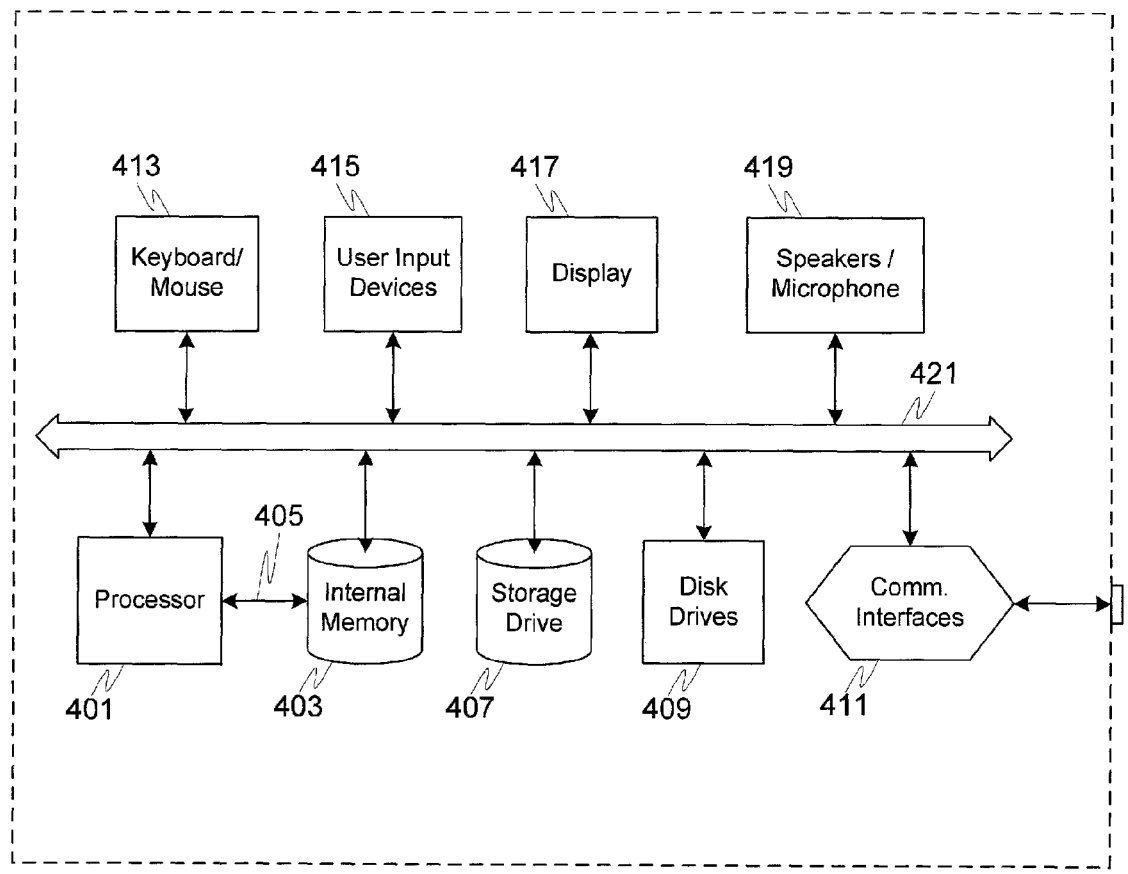
FIG. 4 depicts a computer system suitable for implementing and practicing various embodiments.

FIG. 4 depicts a computer system 400 suitable for implementing and practicing various embodiments. The computer system 400 may be configured in the form of a desktop computer, a laptop computer, a mainframe computer, or any other arrangement capable of being programmed or configured to carry out instructions. The computer system 400 may be located and interconnected in one location, or may be distributed in various locations and interconnected via communication links such as a local or wide area network (LAN or WAN), via the Internet, via the public switched telephone network (PSTN), or other such communication links. Other devices may also be suitable for implementing or practicing the embodiments, or a portion of the embodiments. Such devices include personal digital assistants (PDA), wireless handsets (e.g., a cellular telephone or pager), and other such consumer electronic devices preferably capable of being programmed to carry out instructions or routines.

Typically, a computer system 400 includes a processor 401 which may be embodied as a microprocessor or central processing unit (CPU). The processor 401 is configured to access an internal memory 403, generally via a bus such as the system bus 421. The internal memory 403 may include one or more of random access memory (RAM), read-only memory (ROM), cache memory, or a combination of these or other like types of circuitry configured to store information in a retrievable format. In some implementations the internal memory 403 may be configured as part of the processor 401, or alternatively, may be configured separate from it but within the same packaging. The processor 411 may be able to access internal memory 403 via a different bus or control lines (e.g., local bus 405) than is used to access the other components of computer system 400.

The computer system 400 also includes, or has access to, one or more storage drives 407 (or other types of storage memory) and floppy disk drives 409. Storage drives 407 and the floppy disks for floppy disk drives 409 are examples of machine readable mediums suitable for storing the final or interim results of the various embodiments. Storage drives 407 and the floppy disks for floppy disk drives 409 may also be called computer readable devices or mediums. The floppy disk drives 409 may include a combination of several disc drives of various formats that can read and/or write to removable storage media (e.g., CD-R, CD-RW, DVD, DVD-R, floppy disk, etc.). The computer system 400 may either include the storage drives 407 and floppy disk drives 409 as part of its architecture (e.g., within the same cabinet or enclosure and/or using the same power supply), as connected peripherals, or may access the storage drives 407 and floppy disk drives 409 over a network, or a combination of these. The storage drive 407 is often a hard disk drive configured for the storage and retrieval of data, computer programs or other information. The storage drive 407 need not necessarily be contained within the computer system 400. For example, in some embodiments the storage drive 407 may be server storage space within a network that is accessible to the computer system 400 for the storage and retrieval of data, computer programs or other information. In some instances the computer system 400 may use storage space at a server storage farm, or like type of storage facility, that is accessible by the Internet 450 or other communications lines. The storage drive 407 is often used to store the software, instructions and programs executed by the computer system 400, including for example, all or parts of the computer application program for carrying out various embodiments of the invention.

The computer system 400 may include communication interfaces 411 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The computers system 400 may be connected to the Internet via the wireless router 401, or a wired router or other such access node (not show). The components of computer system 400 may be interconnected by a bus 421 and/or may include expansion slots conforming to any of various industry standards such as PCI (Peripheral Component Interconnect), ISA (Industry Standard Architecture), or EISA (enhanced ISA).

Typically, the computer system 400 includes one or more user input/output devices such as a keyboard and/or mouse 413, or other means of controlling the cursor represented by the user input devices 415 (e.g., touchscreen, touchpad, joystick, trackball, etc.). The communication interfaces 411, keyboard and mouse 413 and user input devices 415 may be used in various combinations, or separately, as means for receiving information and other inputs to be used in carrying out various programs and calculations. A display 417 is also generally included as part of the computer system 400. The display may be any of several types of displays, including a liquid crystal display (LCD), a cathode ray tube (CRT) monitor, a thin film transistor (TFT) array, or other type of display suitable for displaying information for the user. The display 417 may include one or more light emitting diode (LED) indicator lights, or other such display devices. In addition, most computer systems 400 also include, or are connected to, one or more speakers and microphones 419 for audio output and input. Speech recognition software may be used in conjunction with the microphones 419 to receive and interpret user speech commands.

Various activities may be included or excluded as described above, or performed in a different order, while still remaining within the scope of at least one of the various embodiments. For example, rate of speech (block 311) may be calculated at any point in the process after the lexical features have been determined (block 309). Other steps or activities of the methods disclosed herein may be omitted or performed in a different manner while remaining within the intended scope of the invention. The method may be implemented through the addition and manipulation of circuitry to a design, hence is applicable for analysis using logic evaluation frameworks such as logic simulators or formal verification algorithms, as well as hardware-based frameworks such as hardware emulators/accelerators and even fabricated chips.

The invention may be implemented with any sort of processing units, processors and controllers (e.g., processor 401 of FIG. 4) capable of performing the stated functions and activities. For example, the processor 401 may be embodied as a microprocessor, microcontroller, DSP, RISC processor, or any other type of processor that one of ordinary skill would recognize as being capable of performing the functions described herein. A processing unit in accordance with at least one of the various embodiments can operate computer software programs stored (embodied) on computer-readable medium such as the disk drives 409, the storage drive 407 or any other type of hard disk drive, CD, flash memory, ram, or other computer readable medium as recognized by those of ordinary skill in the art.

The computer software programs can aid or perform the steps and activities described above. For example computer programs in accordance with at least one of the various embodiments may include: source code for data mining to create a model of an organizational process based on noisy activity logs; source code for searching for an activity of the model from a corporate information repository containing said noisy activity logs; source code for extract information from the corporate information repository to capture activity based information characterizing the activity; and source code for incorporating the activity into the model. There are many further source codes that may be written to perform the various steps, activities and procedures disclosed above that are intended to lie within the scope of the various embodiments.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method of analyzing data to create a model of an organizational process based on noisy activity logs, wherein said noisy activity logs comprise unstructured activity logs of systems and activities associated with the organizational process, the method comprising:

identify said organizational process;
search for information indicating an activity of the model from a corporate information repository containing said noisy activity logs;
extract said information from the corporate information repository to capture activity based information characterizing said activity;
verify that said activity is part of the organizational process, wherein the verifying of said activity comprises checking an input and an output of said activity to verify a correct result for the activity within said organizational process;
incorporate said activity into the model in response to verifying said activity as part of the organizational process;
validate the model based on inputs from one or more domain experts; and
analyze exceptions to the model;
wherein the search for said activity compares an ontology of said activity with a plurality of ontologies contained within said corporate information repository, wherein the ontology of said activity is a representation of a set of goods and services associated with the activity and relationships between the set of goods and services.

2. The method of claim 1, wherein the search for said activity is performed without human intervention.

3. The method of claim 1, wherein said activity is a first activity, the method further comprising:
analyze a plurality of activities similar to said first activity;
find a second activity to be a suitable alternative to said first activity; and
incorporate said second activity into the model.

4. The method of claim 3, wherein the second activity is incorporated into the model in addition to the first activity as an alternative to the first activity.

5. The method of claim 3, further comprising:
validate the first and second activities using inputs from one or more domain experts.

6. The method of claim 1, wherein the noisy activity logs comprise text selected from at least one of a group consisting of manually entered activity logs, chat scripts, emails, voice transcripts, desktop captures, and tool logs.

7. A software product comprising a program of instructions stored on a non-transitory computer readable device for analyzing data to create a model of an organizational process based on noisy activity logs, wherein said noisy activity logs comprise unstructured activity logs of systems and activities associated with the organizational process, and wherein the program of instructions upon being executed on a computer causes the computer to perform activities comprising:
identify said organizational process;
searching for information indicating an activity of the model from a corporate information repository containing said noisy activity logs;
extracting said information from the corporate information repository to capture activity based information characterizing said activity;
verifying that said activity is part of the organizational process, wherein the verifying of said activity comprises checking an input and an output of said activity to verify a correct result for the activity within said organizational process;
incorporating said activity into the model in response to verifying said activity as part of the organizational process;
validating the model based on inputs from one or more domain experts; and analyzing exceptions to the model;
wherein the search for said activity compares an ontology of said activity with a plurality of ontologies contained within said corporate information repository, wherein the ontology of said activity is a representation of a set of goods and services associated with the activity and relationships between the set of goods and services.

8. The software product of claim 7, wherein the search for said activity is performed without human intervention.

9. The software product of claim 7, wherein said activity is a first activity, the method further comprising:
analyzing a plurality of activities similar to said first activity;
find a second activity to be a suitable alternative to said first activity; and
incorporate said second activity into the model.

10. The software product of claim 9, wherein the second activity is incorporated into the model in addition to the first activity as an alternative to the first activity.

11. The software product of claim 9, further comprising:
validating the first and second activities using inputs from one or more domain experts.

12. The software product of claim 7, wherein the noisy activity logs comprise text selected from at least one of a group consisting of manually entered activity logs, chat scripts, emails, voice transcripts, desktop captures, and tool logs.

13. A system configured for analyzing data to create a model of an organizational process based on noisy activity logs, wherein said noisy activity logs comprise unstructured activity logs of systems and activities associated with the organizational process, the system comprising:
a memory configured to store a corporate information repository containing said noisy activity logs, said memory configured to be suitable for storing a result of identifying said organizational process, and for storing results of searching for information indicating an activity of the model from the corporate information repository;
a processor connected to said memory, said processor being configured to execute instructions for extracting said information from the corporate information repository to capture activity based information characterizing said activity and incorporate said activity into the model in response to verifying that said activity is part of the organizational process, the verifying of said activity comprises checking an input and an output of said activity to verify a correct result for the activity within said organizational process, and analyzing exceptions to the model; and
input devices configured to accept human inputs from one or more domain experts for validating the model, said processor being further configured to execute instructions to validate the model based on said human inputs from one or more domain experts;
wherein the search for said activity compares an ontology of said activity with a plurality of ontologies contained within said corporate information repository, wherein the ontology of said activity is a representation of a set of goods and services associated with the activity and relationships between the set of goods and services.

14. The system of claim 13, wherein said searching for the activity is performed without human intervention.

15. The method of claim 1, wherein the search for said activity further comprises:
identifying the output of the activity and determining sources of unstructured information and communications associated with said output.

16. The software product of claim 7, wherein the search for said activity further comprises:
identifying the output of the activity and determining sources of unstructured information and communications associated with said output.

17. The system of claim 13, wherein the search for said activity further comprises:
identifying the output of the activity and determining sources of unstructured information and communications associated with said output.

18. The method of claim 1, wherein the identifying of said organizational process comprises identifying an output resulting from said organizational process.

19. The software product of claim 7, wherein the identifying of said organizational process comprises identifying an output resulting from said organizational process.

20. The system of claim 13, wherein the identifying of said organizational process comprises identifying an output resulting from said organizational process.

21. The system of claim 13, wherein said activity is a first activity, the processor being configured to execute further instructions comprising:
analyze a plurality of activities similar to said first activity;
find a second activity to be a suitable alternative to said first activity; and
incorporate said second activity into the model.

22. The method of claim 18, further comprising:
determining inputs, communications and services that contribute to said output resulting from said organizational process.

23. The method of claim 1, wherein the identifying of said organizational process comprises identifying one or more purchases used to create a good or service resulting from said organizational process.

24. The method of claim 1, wherein the validating of the model further comprises:
accounting for costs of goods and services produced by said organizational process.

25. The software product of claim 19, further comprising:
determining inputs, communications and services that contribute to said output resulting from said organizational process.

26. The software product of claim 7, wherein the identifying of said organizational process comprises identifying one or more purchases used to create a good or service resulting from said organizational process.

27. The software product of claim 7, wherein the validating of the model further comprises:
accounting for costs of goods and services produced by said organizational process.

28. The system of claim 20, wherein said processor is further configured to execute instructions to determine inputs, communications and services that contribute to said output resulting from said organizational process.

29. The system of claim 13, wherein the identifying of said organizational process comprises identifying one or more purchases used to create a good or service resulting from said organizational process.

30. The system of claim 13, wherein the validating of the model further comprises:
accounting for costs of goods and services produced by said organizational process.

* * * * *